United States Patent
Hu et al.

(10) Patent No.: US 10,437,110 B2
(45) Date of Patent: Oct. 8, 2019

(54) COLOR FILTER SUBSTRATE AND DISPLAY PANEL

(71) Applicant: Au Optronics Corporation, Hsinchu (TW)

(72) Inventors: Rung-Guang Hu, Taoyuan (TW); Wei-Yuan Huang, Miaoli County (TW); Sung-Ying Tsai, Taichung (TW); Hsiang-Pin Fan, Hsinchu (TW); Pin-Miao Liu, Hsinchu County (TW)

(73) Assignee: Au Optronics Corporation, Hsinchu (TW)

( * ) Notice: Subject to any disclaimer, the term of this patent is extended or adjusted under 35 U.S.C. 154(b) by 116 days.

(21) Appl. No.: 15/829,999

(22) Filed: Dec. 4, 2017

(65) Prior Publication Data

US 2018/0321536 A1    Nov. 8, 2018

(30) Foreign Application Priority Data

May 5, 2017   (TW) .............................. 106115041 A

(51) Int. Cl.
  *G02F 1/1339*    (2006.01)
  *G02F 1/1335*    (2006.01)
  *G02F 1/1333*    (2006.01)

(52) U.S. Cl.
  CPC .... *G02F 1/13394* (2013.01); *G02F 1/133512* (2013.01); *G02F 1/133514* (2013.01); *G02F 2001/13396* (2013.01); *G02F 2001/133388* (2013.01)

(58) Field of Classification Search
  CPC .......... G02F 1/13394; G02F 1/133512; G02F 1/133514; G02F 2001/13396; G02F 2001/13398
  See application file for complete search history.

(56) References Cited

U.S. PATENT DOCUMENTS

| 5,936,694 A | 8/1999 | Suzuki et al. |
| 6,667,790 B2 | 12/2003 | Yanagawa et al. |
| 7,375,776 B2 * | 5/2008 | Yeh ..................... G02F 1/13394 349/106 |
| 7,433,004 B2 | 10/2008 | Tsubata et al. |

(Continued)

FOREIGN PATENT DOCUMENTS

| CN | 102147548 | 8/2011 |
| CN | 102269834 | 12/2011 |

(Continued)

*Primary Examiner* — Dung T Nguyen
(74) *Attorney, Agent, or Firm* — JCIPRNET

(57) ABSTRACT

A color filter substrate and a display panel are provided. The color filter substrate includes a substrate, first spacers, second spacers, color resist patterns, and at least one dummy-color resist pattern. A first area has a first projection area A. A second area has a second projection area B. The color resist patterns are disposed at least partially around of at least one of the first spacers. A covering area of the color resist patterns in the first area is a. (a/A)*100% is defined as a first coverage rate M. The dummy-color resist pattern is disposed at least partially around of at least one of the second spacers. The covering area of the dummy-color resist pattern in the second area is b. (b/B)*100% is defined as a second coverage rate N. The first projected area A is equal to the second projected area B and 27%≤(N−M)≤58%.

20 Claims, 9 Drawing Sheets

(56) References Cited

U.S. PATENT DOCUMENTS

| | | |
|---|---|---|
| 8,830,610 B2 | 9/2014 | Matsui et al. |
| 9,057,908 B2 | 6/2015 | Liu et al. |
| 9,304,359 B2 * | 4/2016 | Nagami ................ G02F 1/1339 |
| 2003/0137631 A1 | 7/2003 | Nakayoshi et al. |
| 2008/0123030 A1 | 5/2008 | Song |
| 2012/0300323 A1 | 11/2012 | Matsui et al. |
| 2013/0155537 A1 | 6/2013 | Liu et al. |
| 2014/0376121 A1 | 12/2014 | Kim |
| 2016/0327824 A1 * | 11/2016 | Chen .................. G02F 1/13394 |

FOREIGN PATENT DOCUMENTS

| | | |
|---|---|---|
| CN | 102713695 | 10/2012 |
| CN | 103176232 | 6/2013 |
| CN | 103969883 | 8/2014 |

* cited by examiner

COLOR FILTER SUBSTRATE AND DISPLAY PANEL

CROSS-REFERENCE TO RELATED APPLICATION

This application claims the priority benefit of Taiwan application serial no. 106115041, filed on May 5, 2017. The entirety of the above-mentioned patent application is hereby incorporated by reference herein and made a part of this specification.

BACKGROUND OF THE DISCLOSURE

Field of the Disclosure

The disclosure relates to a color filter substrate and a display panel, and particularly relates to a color filter substrate in which a display area and a peripheral area have different photo spacers.

Description of Related Art

An existing display panel generally includes upper and lower substrates, and a liquid crystal layer is disposed between the upper and lower substrates to produce a liquid crystal cell gap between the upper and lower substrates. In order to maintain a thickness of the liquid crystal cell gap between the upper and lower substrates, a supporting structure is generally set between the upper and lower substrates.

However, in the display panel, a distance between the supporting structure and a sealant used for sealing the upper and lower substrates in a peripheral area located at one side of a display area is quite long, so that a supporting force between the upper and lower substrates in the peripheral area is inadequate, which results in a fact that the liquid crystal cell gap has a recess at an edge of the display area, such that the edge of the display area of the display panel has a color shift phenomenon, which severely influences the quality of the display panel. Therefore, a method is required to be provided to resolve the above problem.

SUMMARY OF THE DISCLOSURE

One aspect of the present disclosure is a color filter substrate. The color filter substrate includes a substrate, a plurality of first photo spacers, a plurality of second photo spacers, a plurality of color photoresist patterns, and at least one dummy-color photoresist pattern. The substrate has a display area and a peripheral area located at at least one side of the display area, where the display area has at least one first region, and the peripheral area has at least one second region. The first photo spacers are disposed on the display area of the substrate. At least one of the first photo spacers is located in the first region of the display area, and the first region has a first projection area A on the substrate. The second photo spacers are disposed on the peripheral area of the substrate. At least one of the second photo spacers is located in the second region of the peripheral area, and the second region has a second projection area B on the substrate. The color photoresist patterns are disposed on the display area of the substrate, and in the first region, the color photoresist patterns are disposed at least partially around at least one of the first photo spacers, and a projection area of the color photoresist patterns in the first region on the substrate is a, wherein (a/A)*100% is defined as a first coverage rate M. The at least one dummy-color photoresist pattern is disposed on the peripheral area of the substrate, and in the second region, the at least one dummy-color photoresist pattern is disposed at least partially around at least one of the second photo spacers, and a projection area of the at least one dummy-color photoresist pattern in the second region on the substrate is b, wherein (b/B)*100% is defined as a second coverage rate N. The first projection area A is substantially equal to the second projection area B, and 27%≤(N−M)≤58%.

One aspect of the present disclosure is a display panel. The display panel includes the aforementioned color filter substrate and a counter substrate. The counter substrate is disposed opposite to the color filter substrate. The first photo spacers and the second photo spacers are located between the counter substrate and the substrate.

Another aspect of the present disclosure is a display panel. The display panel includes the aforementioned color filter substrate and a counter substrate. The counter substrate is disposed opposite to the color filter substrate. The first photo spacers and the second photo spacers are located between the counter substrate and the substrate. Each of the second photo spacers has a compression amount, and the compression amount is substantially equal to a thickness of at least one of the second photo spacers in the second region minus a thickness of at least one of the first photo spacers in the first region before the compression, and the compression amount is substantially not smaller than 0.35 μm, and is substantially not greater than 0.6 μm.

Having briefly described the present disclosure, the above and further objects, features and advantages thereof will be recognized by those skilled in the pertinent art from the following detailed description of the disclosure when taken in conjunction with the accompanying drawings.

BRIEF DESCRIPTION OF THE DRAWINGS

The accompanying drawings are included to provide a further understanding of the disclosure, and are incorporated in and constitute a part of this specification. The drawings illustrate embodiments of the disclosure and, together with the description, serve to explain the principles of the disclosure.

DESCRIPTION OF EMBODIMENTS

Reference will now be made in detail to the present preferred embodiments of the disclosure, examples of which are illustrated in the accompanying drawings. Those skilled in the art should understand that the provided embodiments can be modified in different ways without departing from the spirit or the scope of the disclosure.

The terms used herein such as "about", "approximate", or "substantial" include a related value and an average within an acceptable deviation range of specific values determined by those with ordinary skills in the art with consideration of discussed measurement and a specific number of errors related to the measurement (i.e. a limitation of a measurement system). For example, the term "about" represents to be within one or a plurality of standard deviations of the related value, or within ±30%, ±20%, ±10%, 5%.

Unless otherwise defined, all of the terms (including technical and scientific terms) used herein have the same meaning as commonly understood by those of ordinary skills in the art to which this disclosure belongs. It will be further understood that the terms, such as those defined in commonly used dictionaries, should be interpreted as having a meaning that is consistent with their meaning in the context of the relevant art and will not be interpreted in an idealized or overly formal sense unless expressly so defined herein.

Exemplary embodiments of the disclosure are described with reference of cross-sectional views of schematic diagrams of the idealized embodiments. Therefore, a shape variation of the figures serving as a result of a manufacturing technique and/or manufacturing tolerance is under expectation. Therefore, the embodiments of the disclosure should not be interpreted as being limited to specific shapes of the areas shown in the figures but may include a shape deviation caused by the manufacturing tolerance. For example, a flat area shown in the figures or described in the disclosure may generally have rough and/or non-linear characteristics. Moreover, an illustrated acute angle can be a round angle. Therefore, the areas shown in the figures are substantially schematic, and the shapes thereof are not intended to represent accurate shapes of the areas, and are not intended to be limiting of the scope of the claims of the disclosure.

Figure 1A:
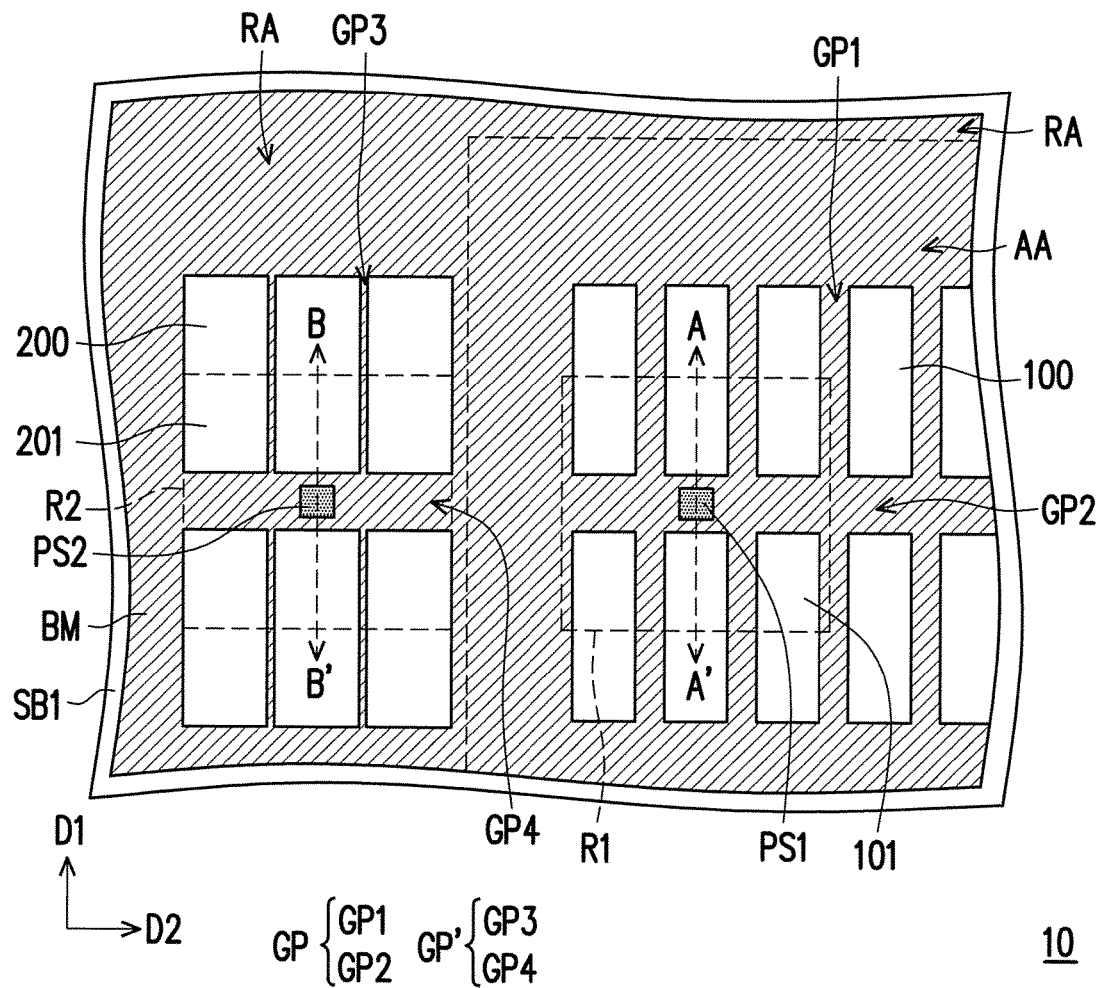
FIG. 1A is a top view of a color filter substrate according to an embodiment of the disclosure.
Figure 1B:
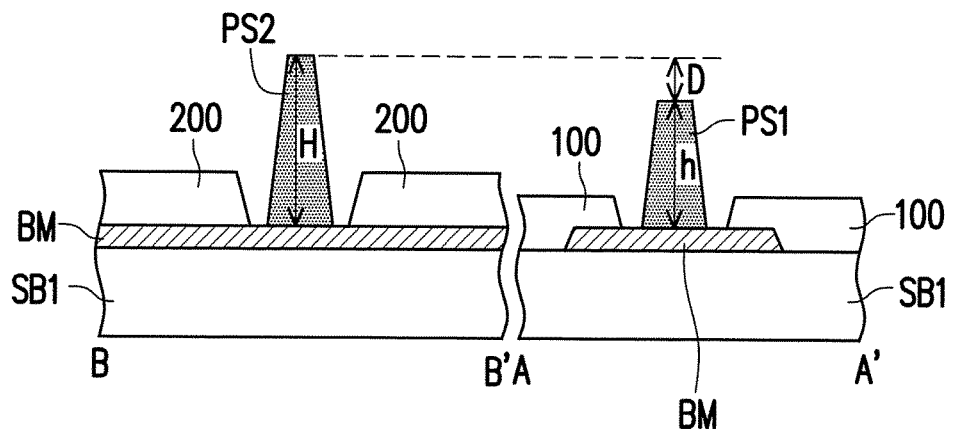
FIG. 1B is a cross-sectional view of FIG. 1A viewing along a section line AA' and a section line BB'.

FIG. 1A is a top view of a color filter substrate 10 according to an embodiment of the disclosure. FIG. 1B is a cross-sectional view of FIG. 1A viewing along a section line AA' and a section line BB'.

Referring to FIG. 1A, the color filter substrate 10 includes a substrate SB1, a plurality of first photo spacers PS1, a plurality of second photo spacers PS2, a plurality of color photoresist patterns 100, and a plurality of dummy-color photoresist pattern 200.

The substrate SB1 has a display area AA and a peripheral area RA located at at least one side of the display area AA. In other embodiments, the peripheral area RA can be partially or entirely located around the display area AA. The display area AA has a first region R1, and the peripheral area RA has a second region R2.

The first photo spacers PS1 are disposed on the display area AA of the substrate SB1. At least one of the first photo spacers PS1 is located in the first region R1 of the display area AA, and the first region R1 has a first projection area A on the substrate SB1 (or referred to as the first region R1 vertically projected on the substrate SB1 has a first area), which has a unit of $\mu m^2$, though the disclosure is not limited thereto. In an embodiment, at least one of the first photo spacers PS1 is substantially located at a shape center of the first region R1. For example, when a projection shape of the first region R1 (or referred to as the first region R1 vertically projected on the substrate SB1 has a shape) is about a square or a round, the first photo spacer PS1 can be located at the center of the first region R1, and when the projection shape of the first region R1 is about a triangle, the first photo spacer PS1 can be located at a center of gravity of the first region R1. In other embodiments, the projection shape of the first region R1 can be a polygon, for example, a pentagon, a hexagon, an ellipse, or other proper shapes.

The second photo spacers PS2 are disposed on the peripheral area RA of the substrate SB1. At least one of the second photo spacers PS2 is located in the second region R2 of the peripheral area RA, and the second region R2 has a second projection area B on the substrate SB1 (or referred to as the second region R2 vertically projected on the substrate SB1 has a second area), which has a unit of though the disclosure is not limited thereto. In an embodiment, at least one of the second photo spacers PS2 is substantially located at a shape center of the second region R2. For example, when a projection shape of the second region R2 (or referred to as the second region R2 vertically projected on the substrate SB1 has a shape) is about a square or a round, the second photo spacer PS2 can be located at the center of the second region R2, and when the projection shape of the second region R2 is about a triangle, the second photo spacer PS2 can be located at a center of gravity of the second region R2. In other embodiments, the projection shape of the second region R2 can be a polygon, for example, a pentagon, a hexagon, an ellipse, or other proper shapes.

In an embodiment, materials of the first photo spacers PS1 and the second photo spacers PS2 are substantially the same. In other embodiments, the materials of the first photo spacers PS1 and the second photo spacers PS2 can also be different. In an embodiment, the materials of the first photo spacers PS1 and the second photo spacers PS2 may include a polymer material, for example, photoresist, polyamide, or other suitable materials, though the disclosure is not limited thereto. In other embodiment, at least one of the first photo spacers PS1 and the second photo spacers PS2 can be transparent or substantially transparent, black color, or other suitable colors.

The color photoresist patterns 100 are disposed on the display area AA of the substrate SB1. In the first region R1, the color photoresist patterns 100 are disposed at least partially around at least one of the first photo spacers PS1, and an area of the substrate covered by the color photoresist patterns 100 in the first region R1 (or namely a projection area of the color photoresist patterns 100 in the first region R1 on the substrate SB1) is a, which has a unit of $\mu m^2$, though the disclosure is not limited thereto, and (a/A)*100% is defined as a first coverage rate M (unitless).

In an embodiment, the color photoresist patterns 100 may include a red color photoresist (for example, a red filter pattern), a blue color photoresist (for example, a blue filter pattern), a green color photoresist (for example, a green filter pattern), a white color photoresist (for example, a white filter pattern or referred to as a transparent filter pattern), a yellow color photoresist (for example, a yellow filter pattern), or a combination of other proper color photoresists, or a combination of at least three different above color photoresists.

In an embodiment, the color photoresist patterns 100 disposed at least partially around the first photo spacers PS1 in the first region R1 may include several blocks 101 separated from each other. In an embodiment, the adjacent blocks of the color photoresist patterns 100 may have a gap GP there between, and the gap GP may include a gap GP1 with an extending direction toward a predetermined direction (for example, a predetermined direction D1) and a gap GP2 with an extending direction toward a predetermined direction (for example, a predetermined direction D2). In an embodiment, the predetermined direction D1 and the predetermined direction D2 are intersected. In other embodiments, the predetermined direction D1 is substantially perpendicular to the predetermined direction D2, though the disclosure is not limited thereto.

The dummy-color photoresist patterns 200 are disposed on the peripheral area RA of the substrate SB1. In the second region R2, at least one dummy-color photoresist pattern 200 is disposed at least partially around at least one of the second photo spacers PS2, and an area of the substrate covered by the dummy-color photoresist pattern 200 in the second region R2 (or namely a projection area of the dummy-color photoresist pattern 200 in the second region R2 on the substrate SB1) is b, which has a unit of $\mu m^2$, though the disclosure is not limited thereto, and (b/B)*100% is defined as a second coverage rate N (unitless). The first projection area A is substantially equal to the second projection area B. In the present embodiment, preferably, the projection shape of the first region R1 is substantially the same to the projection shape of the second region R2, and the first projection area A of the first region R1 is substantially the same to the second projection area B of the second region R2, though the disclosure is not limited thereto. In other embodiments, the projection shape of the first region R1 can be different to the projection shape of the second region R2, though the first projection area A of the first region R1 is substantially the same to the second projection area B of the second region R2.

In an embodiment, one of the first photo spacers PS1 in the display area AA can be first selected, and the first photo spacer PS1 is taken as a shape center (or a center) to define the first region R1 with the first area A. Then, one of the second photo spacers PS2 in the peripheral area RA can be selected, and the second photo spacer PS2 is taken as a center (or a shape center) to define the second region R2 with the second area B, where an area of an orthogonal projection (or referred to as a vertical projection) of the first area A on the substrate SB1 is substantially equal to an area of an orthogonal projection (or referred to as a vertical projection) of the second area B on the substrate SB1, though the disclosure is not limited thereto. In other embodiments, one of the second photo spacers PS2 in the peripheral area RA can be first selected, and the second photo spacer PS2 is taken as a shape center (or a center) to define the second region R2 with the second area B, and then one of the first photo spacers PS1 in the display area AA is selected, and the first photo spacer PS1 is taken as a center (or a shape center) to define the first region R1 with the first area A.

In an embodiment, the dummy-color photoresist patterns 200 may include a red color photoresist (for example, a red filter pattern), a blue color photoresist (for example, a blue filter pattern), a green color photoresist (for example, a green filter pattern), a white color photoresist (for example, a white filter pattern or referred to as a transparent filter pattern), or a combination of other suitable color photoresists, or a combination of at least three different above color photoresists. In an embodiment, a projection area of the color photoresist patterns 100 in the first region R1 is smaller than a projection area of the dummy-color photoresist patterns 200 in the second region R2. In an embodiment, the display area AA includes a plurality of the color photoresist patterns 100 with different color photoresists (for example, at least three different color photoresists), and the peripheral area RA may include the dummy-color photoresist pattern 200 with only one color photoresist. In other embodiments, the display area AA may include a plurality of the color photoresist patterns 100 with different color photoresists (for example, at least three different color photoresists), and the peripheral area RA may also include a plurality of the dummy-color photoresist patterns 200 with different color photoresists (for example, at least two different color photoresists or at least three different color photoresists).

In an embodiment, the dummy-color photoresist patterns 200 disposed at least partially around the second photo spacers PS2 in the second region R2 may include several blocks 201 separated from each other. In an embodiment, the adjacent blocks of the dummy-color photoresist patterns 200 may have a gap GP' therebetween, and the gap GP' may include a gap GP3 with an extending direction toward a predetermined direction (for example, the predetermined direction D1) and a gap GP4 with an extending direction toward a predetermined direction (for example, the predetermined direction D2).

In an embodiment, the color filter substrate 10 may selectively include a black matrix BM. The black matrix BM is disposed between the first photo spacers PS1 and the substrate SB1 and between the second photo spacers PS2 and the substrate SB1. In an embodiment, the black matrix BM can be selectively disposed between a part of the color photoresist patterns 100 and the substrate SB1, and the black matrix BM has a plurality of openings (not shown) corresponding to the plurality of color photoresist patterns 100. In an embodiment, the black matrix BM can be selectively disposed between the dummy-color photoresist patterns 200 and the substrate SB1. In the present embodiment, the black matrix BM on the peripheral area RA does not have the opening (not shown), though the disclosure is not limited thereto. In other embodiments, the black matrix BM on the peripheral area RA may also have a plurality of openings (not shown) corresponding to a plurality of the dummy-color photoresist patterns 200.

Referring to FIG. 1B, in a coating process, the initial materials of the first photo spacers PS1 and the second photo spacers PS2 are still fluids (not shown) in an early stage, a material thickness of the first photo spacers PS1 is influenced by the coverage rate of the color photoresist patterns 100 surrounding at least a part of the first photo spacers PS1, and a material thickness of the second photo spacers PS2 is influenced by the coverage rate of the dummy-color photoresist patterns 200 surrounding at least a part of the second photo spacers PS2. Since the second coverage rate N of the dummy-color photoresist patterns 200 in the second region R2 is greater than the first coverage rate M of the color photoresist patterns 100 in the first region R1, the thickness of the initial material of the second photo spacers PS2 is greater than the thickness of the initial material of the first photo spacers PS1. Therefore, a thickness H of the second photo spacers PS2 obtained after a predetermined process (for example, a photolithography or etching process) is greater than a thickness h of the first photo spacers PS1. A difference between the thickness H of the second photo spacers PS2 and the thickness h of the first photo spacers PS1 is a thickness D.

In the present embodiment, the first photo spacers PS1 in the first region R1 has a profile shape (or a cross-section shape) with a wide bottom and a narrow top, and orthogonal projections (or vertical projections) of the first photo spacers PS1 and the color photoresist patterns 100 on the substrate SB1 are not overlapped, though the disclosure is not limited thereto. In other embodiments, the first photo spacers PS1 may have a profile shape (or a cross-section shape) with a wide top and a narrow bottom. In an embodiment, an orthogonal projection (or namely a vertical projection) of the top of the first photo spacer PS1 located away from the black matrix BM on the substrate SB1 can be overlapped with an orthogonal projection (or namely a vertical projection) of the color photoresist patterns 100 on the substrate SB1. In an embodiment, before the predetermined process (for example, the photolithography or etching process) is performed on the initial material of the first photo spacers PS1, the bottom of the initial material of the first photo spacers PS1 contacts the color photoresist patterns 100, and after the predetermined process (for example, the photolithography or etching process) is performed on the initial material of the first photo spacers PS1, the bottoms of the first photo spacers PS1 do not contact the color photoresist patterns 100.

In the present embodiment, the second photo spacers PS2 in the second region R2 has a profile shape (or a cross-section shape) with a wide bottom and a narrow top, and orthogonal projections (or namely vertical projections) of the second photo spacers PS2 and the dummy-color photoresist patterns 200 on the substrate SB1 are not overlapped, though the disclosure is not limited thereto. In other embodiments, the second photo spacers PS2 may have a profile shape (or a cross-section shape) with a wide top and a narrow bottom, and an orthogonal projection (or namely a vertical projection) of the top of the second photo spacer PS2 located away from the black matrix BM on the substrate SB1 can be overlapped with an orthogonal projection (or namely a vertical projection) of the dummy-color photoresist patterns 200 on the substrate SB1. In an embodiment, before the predetermined process (for example, the photolithography or etching process) is performed on the initial material of the second photo spacers PS2, the bottom of the initial material of the second photo spacers PS2 contacts the dummy-color photoresist patterns 200, and after the predetermined process (for example, the photolithography or etching process) is performed on the initial material of the second photo spacers PS2, the bottoms of the second photo spacers PS2 do not contact the dummy-color photoresist patterns 200. Moreover, the profile shape (or a cross-section shape) of the first photo spacer PS1 is substantially similar to the profile shape (or a cross-section shape) of the second photo spacer PS2 in present embodiment, though the disclosure is not limited thereto. In other embodiments, the profile shape (or a cross-section shape) of the first photo spacer PS1 is different to the profile shape (or a cross-section shape) of the second photo spacer PS2, and the first photo spacers PS1 and the second photo spacers PS2 are all protrusions (for example, extending along a direction away from the surface of the substrate SB1), and the profile shapes (or a cross-section shape) and/or shapes of the vertical projections of the aforementioned spacers on the substrate SB1 can be polygons, for example, trapezoids, rectangles, semicircles, or other proper shapes.

According to the above description, the color filter substrate 10 of the present embodiment includes the color photoresist patterns 100 and the dummy-color photoresist patterns 200, and based on a difference between the coverage rate of at least one of the color photoresist patterns 100 and the coverage rate of at least one of the dummy-color photoresist patterns 200, the first photo spacers PS1 located in the display area AA and the second photo spacers PS2 located in the peripheral area RA may have different thickness (for example, initial thickness), which resolves or mitigates the problem of unevenness of the liquid crystal cell gap at the edge of the display area AA to improve the quality of the display panel.

Figure 2:
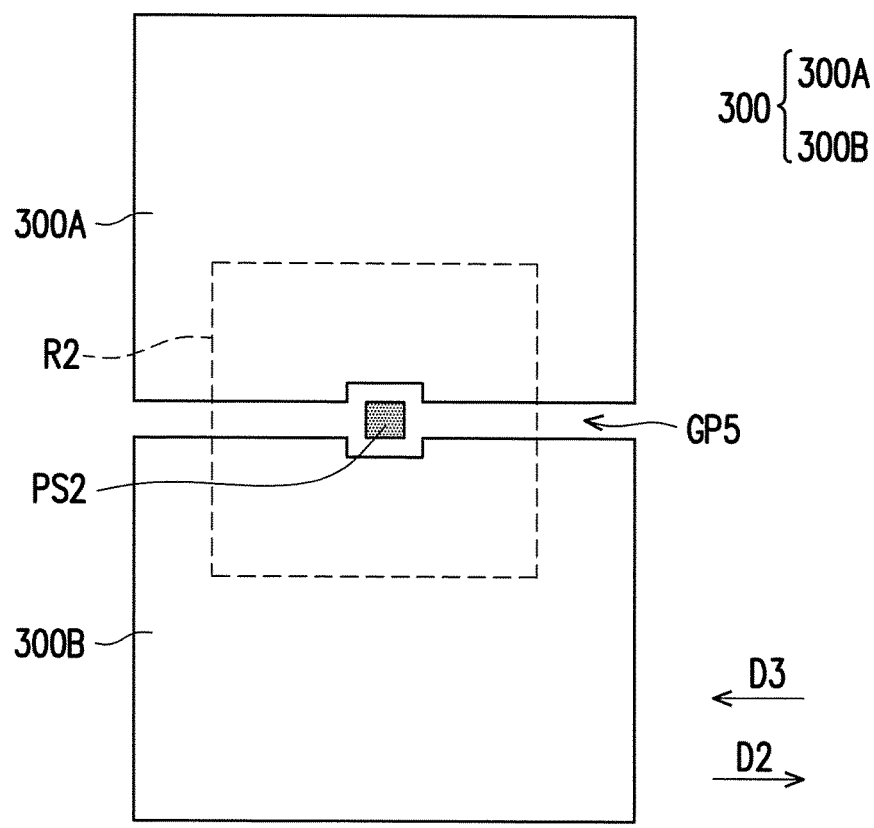
FIG. 2 is a top view of a peripheral area of a color filter substrate according to an embodiment of the disclosure.

FIG. 2 is a top view of a peripheral area of a color filter substrate according to an embodiment of the disclosure. It should be noted that reference numbers of the components and a part of contents of the embodiment of FIG. 1A and FIG. 1B are also used in the embodiment of FIG. 2, wherein the same reference numbers denote the same or like components, and descriptions of the same technical contents are omitted. The aforementioned embodiment can be referred for descriptions of the omitted parts, and detailed descriptions thereof are not repeated in the following embodiment.

A difference between the embodiment of FIG. 2 and the embodiment of FIG. 1A is that compared to the dummy-color photoresist patterns 200 of the embodiment of FIG. 1A, the dummy-color photoresist patterns 300 of the embodiment of FIG. 2 have different projection shapes or shapes of the orthogonal projections (or namely vertical projections) thereof on the substrate SB1.

Referring to FIG. 2, the dummy-color photoresist pattern 300 in the second region R2 includes a block 300A and a block 300B, where a gap GP5 exists between the block 300A and the block 300B, and the gap GP5 extends along predetermined directions (for example, the predetermined direction D2 and a predetermined direction D3) from the position of the second photo spacer PS2. In an embodiment, the predetermined direction D2 and the predetermined direction D3 are, for example, two opposite directions. In other embodiments, the predetermined direction D2 and the predetermined direction D3 are substantially parallel to each other, though the disclosure is not limited thereto. In the present embodiment, the block 300A and the block 300B are separated from each other, i.e. the gap GP5 extends along the predetermined directions D2 and D3 and penetrates through the dummy-color photoresist pattern 300, though the disclosure is not limited thereto. In other embodiments, the gap GP5 does not penetrate through the dummy-color photoresist pattern 300, i.e. the gap GP5 located between the block 300A and the block 300B is closed (for example, the block 300A and the block 300B are connected at ends of the gap GP5), or partially closed (for example, the block 300A and the block 300B are connected at partial ends of the gap GP5, or the block 300A and the block 300B are connected at partial sections of the gap GP5). Since the dummy-color photoresist pattern 300 in the present embodiment has the higher second coverage rate N, the second photo spacers PS2 with thicker thickness are obtained in the present embodiment.

Figure 3:
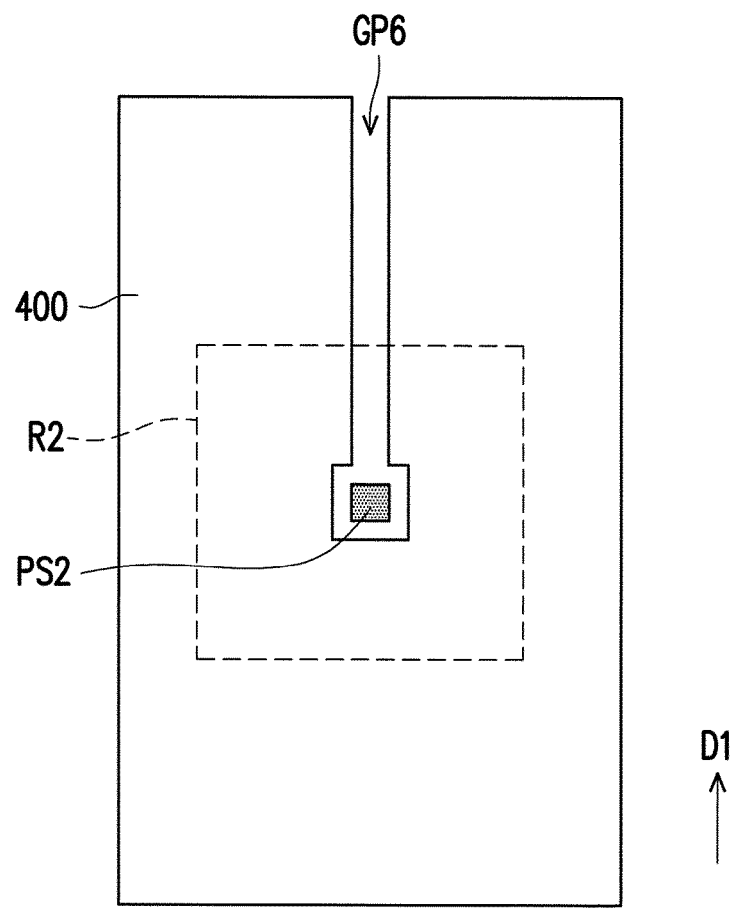
FIG. 3 is a top view of a peripheral area of a color filter substrate according to an embodiment of the disclosure.

FIG. 3 is a top view of a peripheral area of a color filter substrate according to an embodiment of the disclosure. It should be noted that reference numbers of the components and a part of contents of the embodiment of FIG. 1A and FIG. 1B are also used in the embodiment of FIG. 3, wherein the same reference numbers denote the same or like components, and descriptions of the same technical contents are omitted. The aforementioned embodiment can be referred for descriptions of the omitted parts, and detailed descriptions thereof are not repeated in the following embodiment.

A difference between the embodiment of FIG. 3 and the embodiment of FIG. 1A is that compared to the dummy-color photoresist pattern 200 of the embodiment of FIG. 1A, the dummy-color photoresist pattern 400 of the embodiment of FIG. 3 has a different projection shape or a different shape of the orthogonal projection (or namely vertical projections) thereof on the substrate SB1.

Referring to FIG. 3, the dummy-color photoresist pattern 400 has a gap GP6, and the gap GP6 extends along a predetermined direction (for example, the predetermined direction D1) from the position of the second photo spacer PS2. In the present embodiment, the gap GP6 only extends along one predetermined direction from the position of the second photo spacer PS2, so that the dummy-color photoresist pattern 400 in the second region R2 may have higher second coverage rate N. Therefore, the second photo spacers PS2 with thicker thickness are obtained in the present embodiment. In other embodiments, the second coverage rate N of the dummy-color photoresist pattern 400 of FIG. 3 can be approximately greater than the second coverage rate N of the dummy-color photoresist pattern 300 of FIG. 2, so that the thickness of the second photo spacers PS2 obtained in the embodiment of FIG. 3 is thicker than the thickness of the second photo spacers PS2 obtained in the embodiment of FIG. 2.

Figure 4:
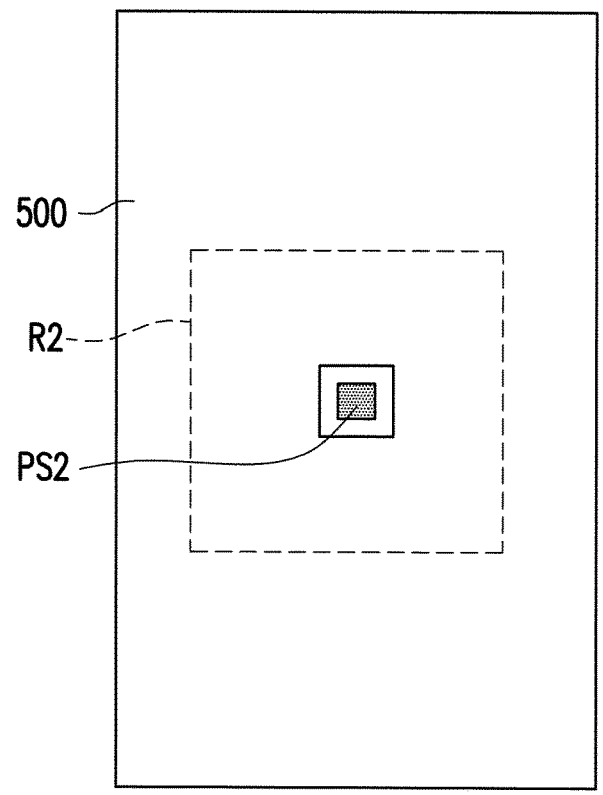
FIG. 4 is a top view of a peripheral area of a color filter substrate according to an embodiment of the disclosure.

FIG. 4 is a top view of a peripheral area of a color filter substrate according to an embodiment of the disclosure. It should be noted that reference numbers of the components and a part of contents of the embodiment of FIG. 1A and FIG. 1B are also used in the embodiment of FIG. 4, wherein the same reference numbers denote the same or like components, and descriptions of the same technical contents are omitted. The aforementioned embodiment can be referred for descriptions of the omitted parts, and detailed descriptions thereof are not repeated in the following embodiment.

A difference between the embodiment of FIG. 4 and the embodiment of FIG. 1A is that compared to the dummy-color photoresist pattern 200 of the embodiment of FIG. 1A, the dummy-color photoresist pattern 500 of the embodiment of FIG. 4 has a different projection shape or a different shape of the orthogonal projection (or namely vertical projections) thereof on the substrate SB1.

Referring to FIG. 4, the dummy-color photoresist pattern 500 in the second region R2 is integral, and is not divided into a plurality of blocks as the dummy-color photoresist pattern 200 does in the embodiment of FIG. 1A, i.e. the dummy-color photoresist pattern 500 does not have the gap and only has a region for containing the second photo spacer PS2, and the dummy-color photoresist pattern 500 surrounds the second photo spacer PS2, so that the dummy-color photoresist pattern 500 in the second region R2 has higher second coverage rate N. Therefore, the second photo spacers PS2 with thicker thickness are obtained in the present embodiment. In other embodiments, the second coverage rate N of the dummy-color photoresist pattern 500 of FIG. 4 can also be greater than the second coverage rate N of the dummy-color photoresist pattern 400 of FIG. 3, so that the thickness of the second photo spacers PS2 obtained in the embodiment of FIG. 4 is thicker than the thickness of the second photo spacers PS2 obtained in the embodiment of FIG. 3.

Figure 5:
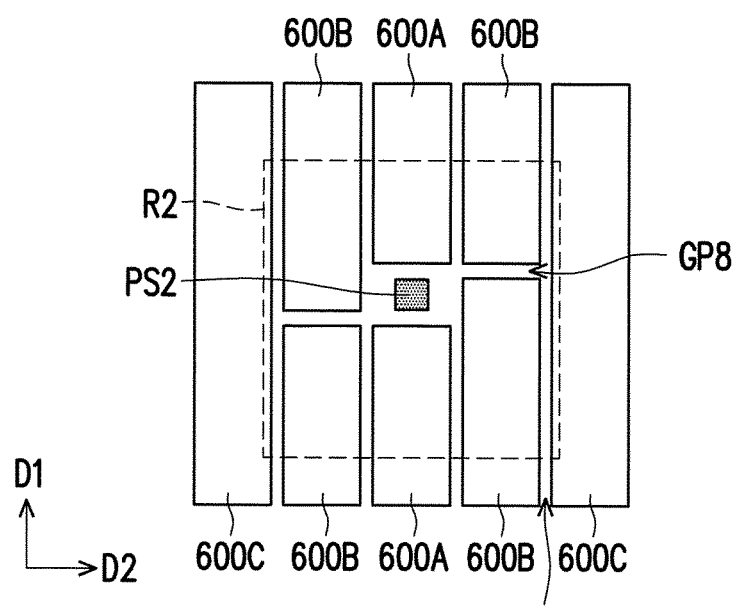
FIG. 5 is a top view of a peripheral area of a color filter substrate according to an embodiment of the disclosure.

FIG. 5 is a top view of a peripheral area of a color filter substrate according to an embodiment of the disclosure. It should be noted that reference numbers of the components and a part of contents of the embodiment of FIG. 1A and FIG. 1B are also used in the embodiment of FIG. 5, wherein the same reference numbers denote the same or like components, and descriptions of the same technical contents are omitted. The aforementioned embodiment can be referred for descriptions of the omitted parts, and detailed descriptions thereof are not repeated in the following embodiment.

A difference between the embodiment of FIG. 5 and the embodiment of FIG. 1A is that the embodiment of FIG. 5 includes a plurality of different dummy-color photoresist patterns.

Referring to FIG. 5, the second region R2 at least includes a dummy-color photoresist pattern 600A, a dummy-color photoresist pattern 600B and a dummy-color photoresist pattern 600C, where the dummy-color photoresist pattern 600A, the dummy-color photoresist pattern 600B and the dummy-color photoresist pattern 600C are separated blocks. In an embodiment, the dummy-color photoresist pattern 600A, for example, includes a blue color photoresist, the dummy-color photoresist pattern 600B, for example, includes a green color photoresist, the dummy-color photoresist pattern 600C, for example, includes a red color photoresist. In the present embodiment, between the adjacent dummy-color photoresist patterns (for example, between the dummy-color photoresist pattern 600C and the dummy-color photoresist pattern 600B and/or between the dummy-color photoresist pattern 600A and the dummy-color photoresist pattern 600B) include a gap GP7 extending along a predetermined direction (for example, the predetermined direction D1), and the blocks of the dummy-color photoresist pattern 600A and/or the blocks of the dummy-color photoresist pattern 600B may respectively include a gap GP8 extending along a predetermined direction (for example, the predetermined direction D2) therebetween, wherein the predetermined direction D1 is different to the predetermined direction D2. In an embodiment, the predetermined direction D1 is intersected with the predetermined direction D2. In other embodiments, the predetermined direction D1 is substantially perpendicular to the predetermined direction D2, though the disclosure is not limited thereto. The second region R2 of the present embodiment includes a plurality of different dummy-color photoresist patterns, and different colors of the dummy-color photoresist patterns are adopted to adjust the coverage rate of the dummy-color photoresist patterns in the second region R2. Moreover, in the present embodiment, areas of vertical projections of the dummy-color photoresist pattern 600A, the dummy-color photoresist pattern 600B and the dummy-color photoresist pattern 600C on the substrate SB1 are different to each other, though the disclosure is not limited thereto. In other embodiments, the area of the vertical projection of at least one of the dummy-color photoresist pattern 600A, the dummy-color photoresist pattern 600B and the dummy-color photoresist pattern 600C on the substrate SB1 can be different to the areas of the vertical projections of other of the dummy-color photoresist pattern 600A, the dummy-color photoresist pattern 600B and the dummy-color photoresist pattern 600C on the substrate SB1.

Figure 6:
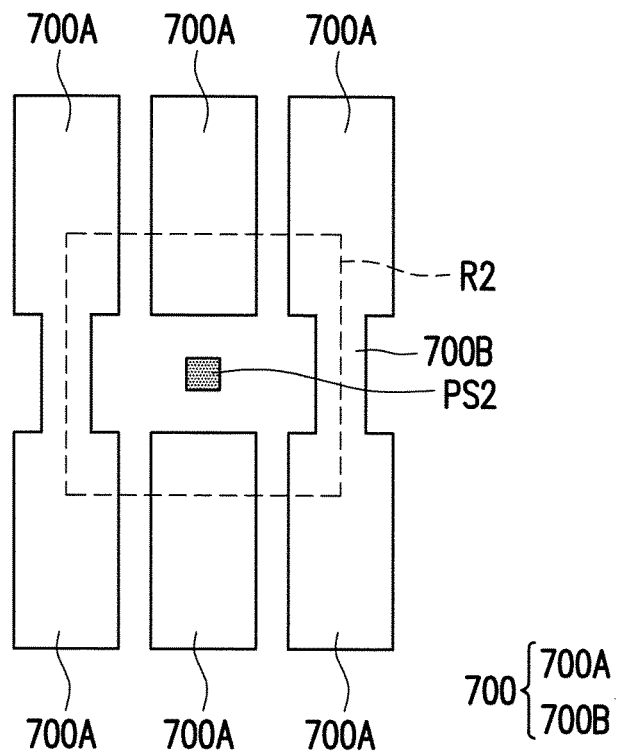
FIG. 6 is a top view of a peripheral area of a color filter substrate according to an embodiment of the disclosure.

FIG. 6 is a top view of a peripheral area of a color filter substrate according to an embodiment of the disclosure. It should be noted that reference numbers of the components and a part of contents of the embodiment of FIG. 1A and FIG. 1B are also used in the embodiment of FIG. 6, wherein the same reference numbers denote the same or like components, and descriptions of the same technical contents are omitted. The aforementioned embodiment can be referred for descriptions of the omitted parts, and detailed descriptions thereof are not repeated in the following embodiment.

A difference between the embodiment of FIG. 6 and the embodiment of FIG. 1A is that the dummy-color photoresist pattern 700 of the embodiment of FIG. 6 further includes a connection block 700B.

Referring to FIG. 6, the dummy-color photoresist pattern 700 includes a plurality of separated blocks 700A and at least one connection block 700B. The connection block 700B connects two adjacent blocks 700A separated from each other. In the present embodiment, the connection block 700B is located in the second region R2, and the coverage rate of the dummy-color photoresist pattern in the second region R2 can be adjusted through the connection block 700B. The connection block 700B of the present embodiment, for example, connects the two adjacent blocks 700A separated from each other and located at the edge of the second region R2, though the disclosure is not limited thereto. In other embodiments, the connection block 700B may also connect the two adjacent blocks 700A separated from each other and located in the second region R2. The dummy-color photoresist pattern 700 of the present embodiment may include the color photoresist pattern of one color or the color photoresist patterns of multiple colors.

Figure 7:
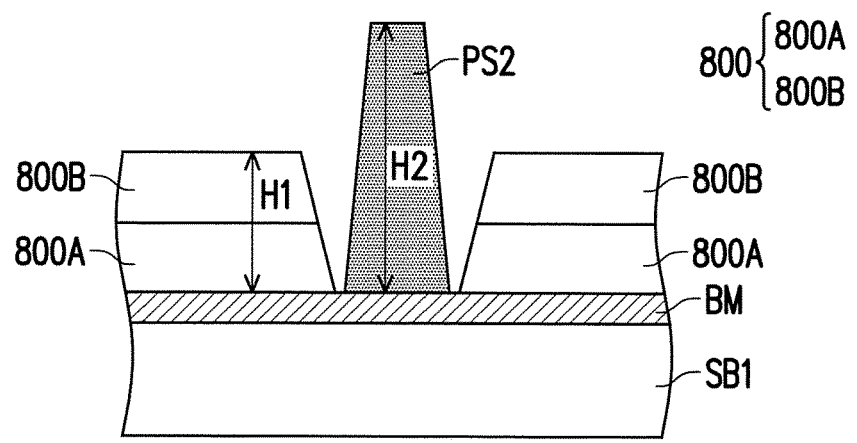
FIG. 7 is a cross-sectional view of a peripheral area of a color filter substrate according to an embodiment of the disclosure.

FIG. 7 is a cross-sectional view of a peripheral area of a color filter substrate according to an embodiment of the disclosure. It should be noted that reference numbers of the components and a part of contents of the embodiment of FIG. 1A and FIG. 1B are also used in the embodiment of FIG. 7, wherein the same reference numbers denote the same or like components, and descriptions of the same technical contents are omitted. The aforementioned embodiment can be referred for descriptions of the omitted parts, and detailed descriptions thereof are not repeated in the following embodiment.

A difference between the embodiment of FIG. 7 and the embodiment of FIG. 1B is that the dummy-color photoresist pattern 800 of the embodiment of FIG. 7 can be a multi-layer structure formed by stacking at least two colors of the color photoresists, and the dummy-color photoresist pattern 200 of the embodiment of FIG. 1B can be a single-layer structure formed by one color of the color photoresist.

Referring to FIG. 7, the dummy-color photoresist pattern 800 is formed by stacking a first color photoresist 800A and a second color photoresist 800B, and a thickness H1 of the stacked color photoresists of at least two colors is smaller than a thickness H2 of the second photo spacer PS2. In an embodiment, the first color photoresist 800A and the second color photoresist 800B include different colors of the color photoresists. In the present embodiment, the dummy-color photoresist pattern 800 is formed by stacking two layers of the color photoresists, though the disclosure is not limited thereto. In other embodiments, the dummy-color photoresist pattern 800 is formed by stacking three layers or more of the color photoresists. In the present embodiment, since the dummy-color photoresist pattern 800 in the second region R2 includes two layers or more of the color photoresists, the initial material of the second photo spacer PS2 can be influenced by a space occupied by the dummy-color photoresist pattern 800, and is piled up higher, such that after the initial material of the second photo spacer PS2 is cured, the thickness of the second photo spacer PS2 is thicker.

Figure 8:
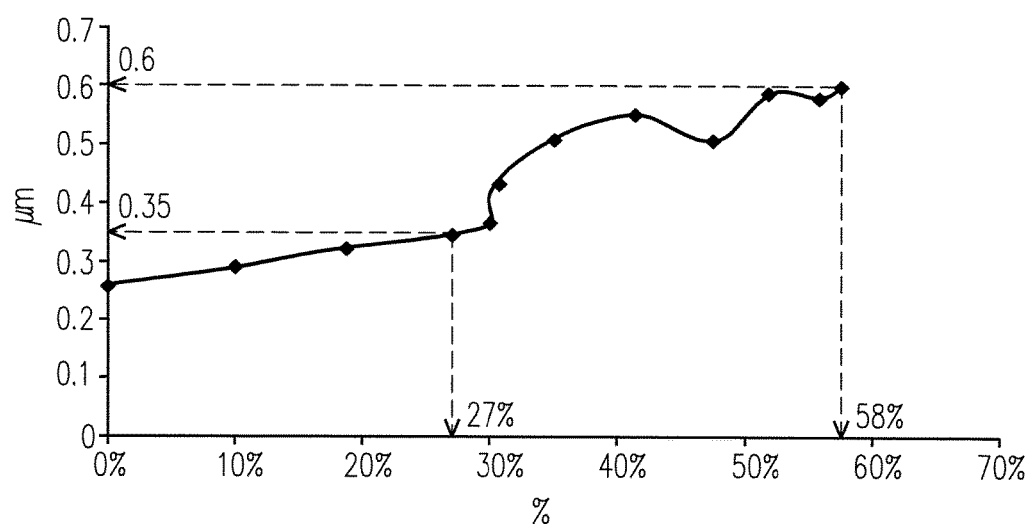
FIG. 8 is a broken-line diagram of a relationship between a coverage rate difference of a color photoresist pattern, a dummy-color photoresist pattern, and a thickness difference of a first photo spacer and a second photo spacer according to some embodiments of the disclosure.

FIG. 8 is a broken-line diagram of a relationship between a coverage rate difference of the color photoresist pattern, the dummy-color photoresist pattern, and a thickness difference of the first photo spacer and the second photo spacer according to some embodiments of the disclosure.

A longitudinal axis (or namely a vertical axis) of FIG. 8 represents values of the thickness H of the second photo spacer minus the thickness h of the first photo spacer (with a unit of μm), and a latitudinal axis (or namely a horizontal axis) represents values of the second coverage rate N of the dummy-color photoresist pattern in the second region minus the first coverage rate M of the color photoresist pattern in the first region (unitless).

When the value of the thickness H of the second photo spacer PS2 minus the thickness h of the first photo spacer is smaller than 0.35 μm, a supporting force provided to the upper and lower substrates by the second photo spacers PS2 is inadequate, and the liquid crystal cell gap is still easy to have a recess at the peripheral area. When the value of the thickness H of the second photo spacer PS2 minus the thickness h of the first photo spacer is greater than 0.6 μm, the second photo spacers PS2 may stretch out the upper and lower substrates, such that the thickness of the liquid crystal cell gap is too thick in the peripheral area, and the display quality of the liquid crystal display panel is decreased (for example, to produce a light leakage, and in case of a black or dark frame (or namely image), the frame at the light leakage is biased to white). In an embodiment, 0.35 μm≤the thickness H of the second photo spacer PS2 minus the thickness h of the first photo spacer PS1≤0.6 m, and the thickness of the liquid crystal cell gap in the peripheral area RA is close to the thickness of the liquid crystal cell gap in the display area AA, so that the liquid crystal display panel may have good display quality.

According to FIG. 8, it is known that by adjusting the value of the second coverage rate N of the dummy-color photoresist pattern in the second region minus the first coverage rate M of the color photoresist pattern in the first region, the value of the thickness H of the second photo spacer PS2 minus the thickness h of the first photo spacer PS1 is changed. According to the data of FIG. 8, it is known that if 27% (N−M)≤58%, 0.35 μm (H−h)≤0.6 μm, and the color shift phenomenon occurred at the edge of the display area AA of the display panel is mitigated.

Figure 9A:
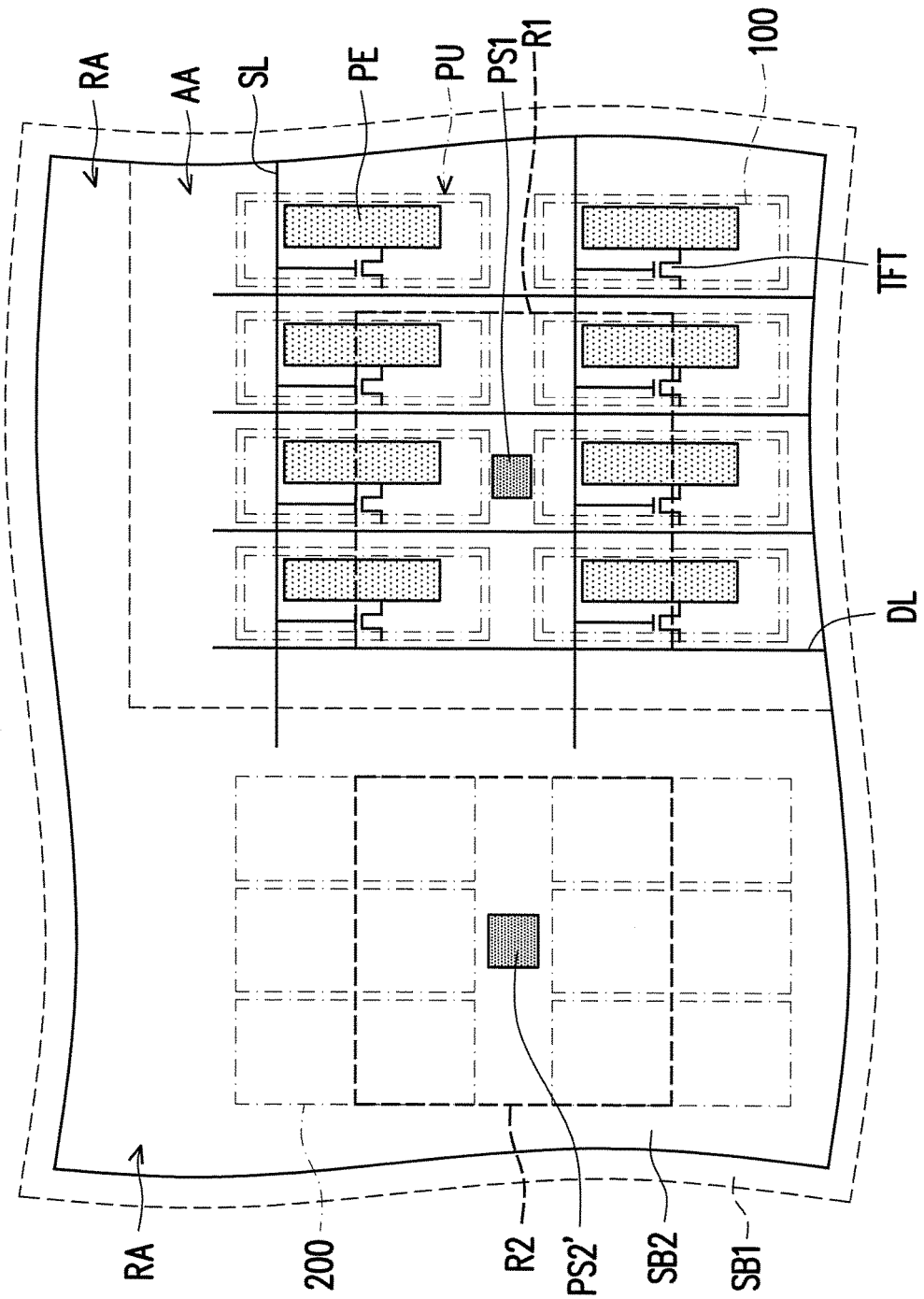
FIG. 9A is a bottom view of a display panel according to an embodiment of the disclosure.
Figure 9B:
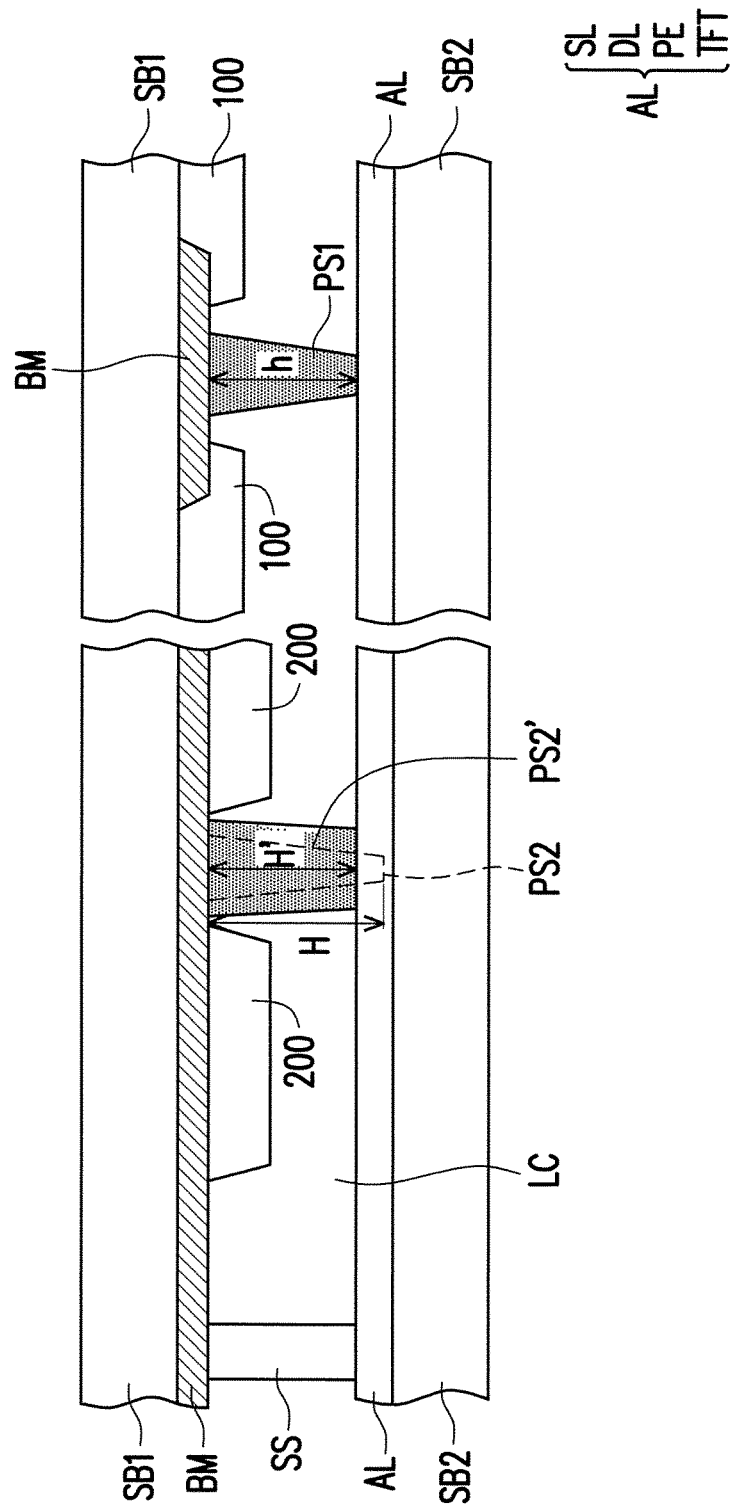
FIG. 9B is a cross-sectional view of a display panel according to an embodiment of the disclosure.

FIG. 9A is a bottom view of a display panel according to an embodiment of the disclosure. FIG. 9B is a cross-sectional view of a display panel according to an embodiment of the disclosure. It should be noted that reference numbers of the components and a part of contents of the embodiment of FIG. 1A and FIG. 1B are also used in the embodiment of FIG. 9A and FIG. 9B, wherein the same reference numbers denote the same or like components, and descriptions of the same technical contents are omitted. The aforementioned embodiment can be referred for descriptions of the omitted parts, and detailed descriptions thereof are not repeated in the following embodiment.

Referring to FIG. 9A and FIG. 9B, a counter substrate (or referred to as a second substrate) SB2 includes a plurality of scan lines SL, a plurality of data lines DL, a plurality of switch devices TFT and a plurality of pixel electrodes PE. At least one pixel electrode PE can be electrically connected to at least one scan line SL and at least one data line DL through at least one switch device TFT. Wherein the scan lines SL, the data lines DL, the switch devices TFT and the pixel electrodes PE can be named a device layer AL. In an embodiment, the color photoresist patterns 100 are disposed corresponding to positions of the pixel electrodes PE. If the display area AA has a plurality of sub-pixels PU, each sub-pixel PU at least includes at least one pixel electrode PE (located on the counter substrate SB2) and at least one corresponding color photoresist pattern 100 (located on the substrate SB1 (or referred to as a first substrate)), and the at least one pixel electrode PE can be electrically connected to at least one scan line SL and at least one data line DL through at least one switch device TFT. Therefore, the display area AA can be referred to as an area of the display panel used for displaying images, and the peripheral area RA can be referred to as an area of the display panel not used for displaying images. In an embodiment, a single pixel may include at least three sub-pixels PU, and a first projection area A of the first region R1 and a second projection area B of the second region R2 can all be a projection area of a single pixel. In the present embodiment, although only the scan lines SL, the data lines DL, the switch devices TFT and the pixel electrodes PE are drawn in the display area AA, the disclosure is not limited thereto. In other embodiments, the scan lines SL, the data lines DL, the switch devices TFT and the pixel electrodes PE can also be located in at least a part of the peripheral area RA, and the at least a part of the peripheral area RA can be referred to as an extended display area, and the extended display area is also referred to as an area of the display panel used for extendingly displaying images, and a calculation method of the related coverage rate of the extended display area is the same to the calculation method of the second coverage rate N of the second region R2, and the related coverage rate difference is also the same as that described above.

The counter substrate SB2 is disposed opposite to the substrate SB1 of the color filter substrate, and the first photo spacers PS1 and the second photo spacers PS2' are located between the counter substrate SB2 and the substrate SB1. The counter substrate SB2 and the substrate SB1 are adhered through a sealant SS. The counter substrate SB2, the substrate SB1 and the sealant SS include a display medium (for example, a non-self luminous material (for example, a liquid crystal layer LC, electrowetting, electric dust or other suitable materials), or other suitable materials) there between. In an embodiment, when the counter substrate SB2 and the substrate SB1 are adhered, since a thickness of the sealant SS is smaller than the thickness (for example, the initial thickness H or referred to as an uncompressed thickness) of the second photo spacer PS2', the second photo spacer PS2' may have a compression amount, and the compression amount is substantially equal to a difference between the thickness (for example, the initial thickness H) of the second photo spacer PS2 and the thickness (for example, the initial thickness h) of the first photo spacer PS1 before the counter substrate SB2 is adhered to the substrate SB1, i.e. the thickness (for example, the initial thickness H) of the second photo spacer PS2 before the compression minus the thickness (for example, the initial thickness h) of the first photo spacer PS1. In an embodiment, the compression amount of the second photo spacer PS2' is substantially not smaller than 0.35 μm, and is substantially not greater than 0.6 μm. In an embodiment, a thickness H' of the compressed second photo spacer PS2' can be substantially equal to the thickness (for example, the initial thickness h) of the first photo spacer PS1, though the disclosure is not limited thereto. In other embodiments, the thickness H' of the compressed second photo spacer PS2' can be approximately greater than the initial thickness h of the first photo spacer PS1, and a difference between the thickness H' of the compressed second photo spacer PS2' and the initial thickness h of the first photo spacer PS1 can be a predetermined value or a value of the compression amount. In an embodiment, the first photo spacer PS1 is also slightly compressed to have a compression amount, and the compression amount of the second photo spacer is also greater than the compression amount of the first photo spacer, and a difference between the thickness H' of the compressed second photo spacer PS2' and the thickness of the compressed first photo spacer PS1 can be a predetermined value or a value of the compression amount.

According to the above description, the display panel of the present embodiment includes the color photoresist patterns 100 and the dummy-color photoresist patterns 200, and based on the difference between the coverage rates of the color photoresist patterns 100 and the dummy-color photoresist patterns 200, the first photo spacers PS1 located in the display area AA and the second photo spacers PS2' located in the peripheral area may have different thickness (for example, the initial thickness), which resolves the problem of unevenness of the liquid crystal cell gap at the edge of the display area AA due to recess or excessive protrusion of the liquid crystal cell gap, and improve the quality of the display panel.

Figure 10:
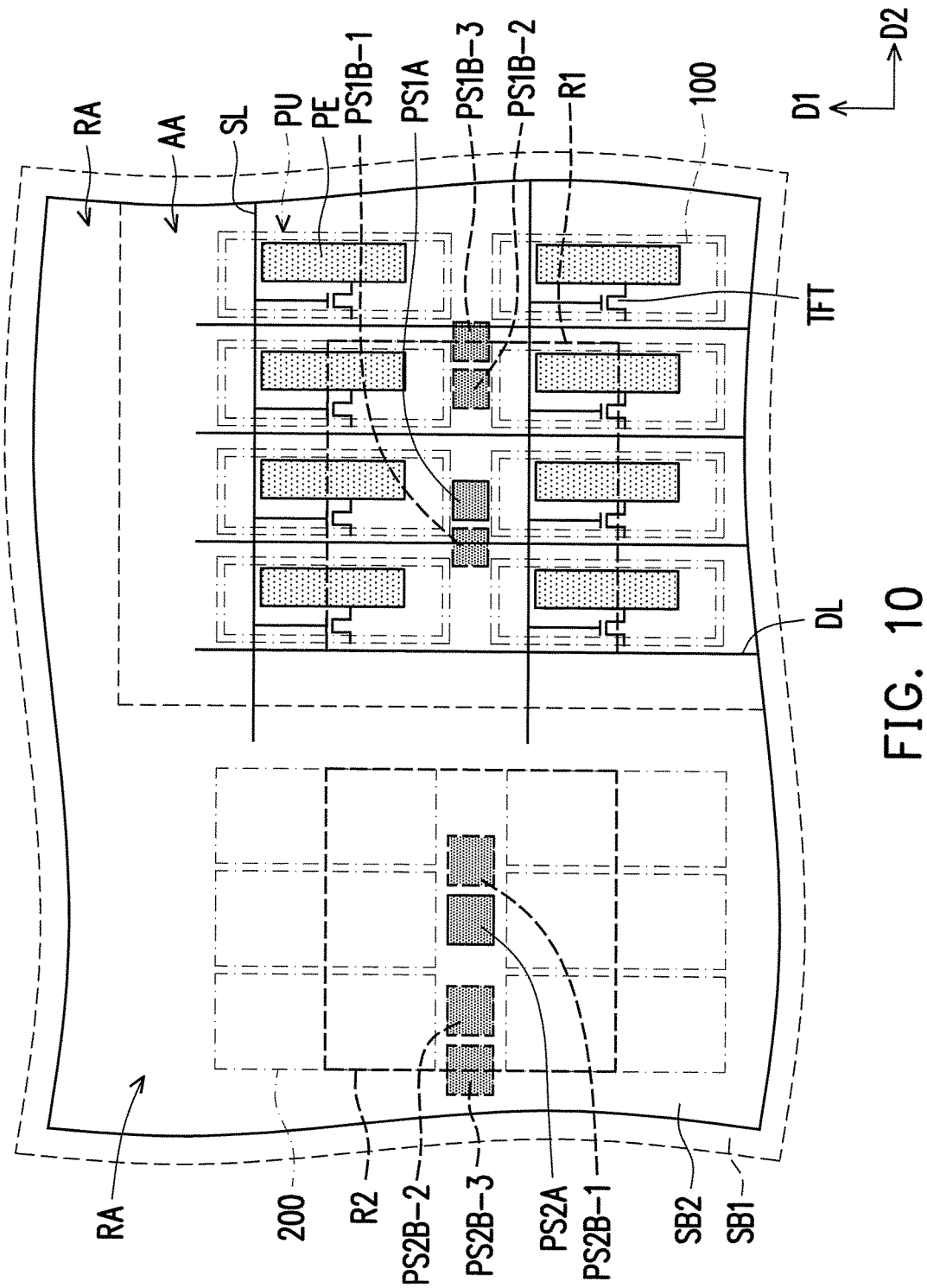
FIG. 10 is a bottom view of a display panel according to an embodiment of the disclosure.

FIG. 10 is a bottom view of a display panel according to an embodiment of the disclosure. It should be noted that reference numbers of the components and a part of contents of the embodiment of FIG. 9A are also used in the embodiment of FIG. 10, wherein the same reference numbers denote the same or like components, and descriptions of the same technical contents are omitted. The aforementioned embodiment can be referred for descriptions of the omitted parts, and detailed descriptions thereof are not repeated in the following embodiment. It should be noted that the first photo spacer PS1B-1, the first photo spacer PS1B-2 and the first photo spacer PS1B-3 are not necessarily appeared at the same time, and the second photo spacer PS2B-1, the second photo spacer PS2B-2 and the second photo spacer PS2B-3 are not necessarily appeared at the same time.

A difference between the embodiment of FIG. 10 and the embodiment of FIG. 9A is that the first region R1 of the embodiment of FIG. 10 may include more than one first photo spacer, and the second region R2 may include more than one second photo spacer.

Referring to FIG. 10, the first photo spacer PS1A is located at a shape center (or a center) of the first region R1, and the second photo spacer PS2A is located at a shape center (or a center) of the second region R2.

In an embodiment, the first region R1 includes two first photo spacers including the first photo spacer PS1A and the first photo spacer PS1B-1, and the second region R2 includes two second photo spacers including the second photo spacer PS2A and the second photo spacer PS2B-1. Since the first photo spacer PS1B-1 is very close to the shape center of the first region R1, and the second photo spacer PS2B-1 is very close to the shape center of the second region R2, the first photo spacer PS1B-1 and the second photo spacer PS2B-1 have not much influence on calculation of the first coverage rate M and the second coverage rate N, and the first coverage rate M and the second coverage rate N can be accurately calculated. In this way, when the first region R1 has two or more first photo spacers, the first photo spacer PS1B-1 or PS1A can be selected as the shape center (or the center). When the second region R2 has two or more second photo spacers, the second photo spacer PS2A or PS2B-1 can be selected as the shape center (or the center). In other embodiments, bottoms of the first photo spacers PS1B-1 and PS1A can be selectively connected or separated. In other embodiments, bottoms of the second photo spacers PS2B-1 and PS2A can be selectively connected or separated.

In an embodiment, the first region R1 may include two first photo spacers including the first photo spacer PS and the first photo spacer PS1B-2, and the second region R2 may also include two second photo spacers including the second photo spacer PS2A and the second photo spacer PS2B-2. Since the first photo spacer PS1B-2 is located away from the shape center of the first region R1, and the second photo spacer PS2B-2 is located away from the shape center of the second region R2, the first photo spacer PS1B-2 and the second photo spacer PS2B-2 probably have some influence on calculation of the first coverage rate M and the second coverage rate N, though the first photo spacer PS1B-2 and the second photo spacer PS2B-2 are still respectively within the range of the first region R1 and the second region R2, and the calculated first coverage rate M and second coverage rate N are not obviously deviated.

In an embodiment, the first region R1 may include two first photo spacers including the first photo spacer PS1A and the first photo spacer PS1B-3, and the second region R2 may also include two second photo spacers including the second photo spacer PS2A and the second photo spacer PS2B-3. Since the first photo spacer PS1B-3 is located farther away from the shape center of the first region R1, and the second photo spacer PS2B-3 is located farther away from the shape center of the second region R2, for example, the first photo spacer PS1B-3 is overlapped with an edge of the first region R1, and the first photo spacer PS1B-3 is even overlapped with an edge of another first region R1, and the second photo spacer PS2B-3 is, for example, overlapped with an edge of the second region R2, and the second photo spacer PS2B-3 is even overlapped with an edge of another second region R2. Therefore, the first photo spacer PS1B-3 and the second photo spacer PS2B-3 probably have a larger influence on calculation of the first coverage rate M and the second coverage rate N, or it is unable to distinguish the region where the photo spacer overlapped with the edge belongs to in calculation of the coverage rate, and the calculated first coverage rate M and second coverage rate N have larger errors.

Therefore, when the first region R1 includes two or more first photo spacers, and/or the second region R2 includes two or more second photo spacers, by adjusting sizes of the first region R1 and the second region R2, the edge of the first region R1 is not overlapped with some first photo spacers or the second region R2, and the edge of the second region R2 is not overlapped with some second photo spacers or the first region R1, such that the calculated first coverage rage M and the second coverage rate N are more accurate. However, a projection area of the first region R1 is still substantially equal to a projection area of the second region R2, or the projection areas of the first region R1 and the second region R2 are respectively a projection area of a single pixel substantially the same to each other. Moreover, in the present embodiment, the number of the first photo spacers in the first region R1 can be substantially the same to the number of the second photo spacers in the second region R2, though the disclosure is not limited thereto. In other embodiments, the number of the first photo spacers in the first region R1 can be different to the number of the second photo spacers in the second region R2.

Moreover, a shape of a vertical projection of at least one of the color photoresist patterns, the dummy-color photoresist patterns, the pixel electrodes and the openings of the aforementioned embodiments on the substrate is, for example, a rectangle, though the disclosure is not limited thereto. In other embodiments, the shape of the vertical projection of at least one of the color photoresist patterns, the dummy-color photoresist patterns, the pixel electrodes and the openings of the aforementioned embodiments on the substrate can be a polygon, for example, a triangle, a square, a pentagon, a hexagon, a round, an ellipse, or other proper shapes. A shape of a vertical projection of at least one of the first photo spacers and the second photo spacers of the aforementioned embodiments on the substrate is, for example, a square, though the disclosure is not limited thereto. In other embodiments, the shape of the vertical projection of at least one of the first photo spacers and the second photo spacers of the aforementioned embodiments on the substrate can be a polygon, for example, a triangle, a square, a pentagon, a hexagon, a round, an ellipse, or other proper shapes. In the aforementioned embodiments, the bottom of the first photo spacer does not contact the color photoresist patterns and/or the bottom of the second photo spacer does not contact at least one of the dummy-color photoresist patterns, though the disclosure is not limited thereto. In other embodiments, at least one side of the bottom of the first photo spacer does not contact the color photoresist patterns and/or at least one side of the bottom of the second photo spacer does not contact the dummy-color photoresist patterns. The content described in the aforementioned embodiments can be selectively combined or replaced, and the disclosure is not limited to the content described in the aforementioned single embodiment.

It will be apparent to those skilled in the art that various modifications and variations can be made to the structure of the disclosure without departing from the scope or spirit of the disclosure. In view of the foregoing, it is intended that the disclosure cover modifications and variations of this disclosure provided they fall within the scope of the following claims and their equivalents.

What is claimed is:

1. A color filter substrate, comprising:
a substrate, having a display area and a peripheral area located at at least one side of the display area, wherein the display area has at least one first region, and the peripheral area has at least one second region;
a plurality of first photo spacers, disposed on the display area of the substrate, wherein at least one of the first photo spacers is located in the first region of the display area, and the first region has a first projection area A on the substrate;
a plurality of second photo spacers, disposed on the peripheral area of the substrate, wherein at least one of the second photo spacers is located in the second region of the peripheral area, and the second region has a second projection area B on the substrate;
a plurality of color photoresist patterns, disposed on the display area of the substrate, wherein in the first region, the color photoresist patterns are disposed at least partially around the at least one of the first photo spacers, and a projection area of the color photoresist patterns in the first region on the substrate is a, wherein $(a/A)*100\%$ is defined as a first coverage rate M; and
at least one dummy-color photoresist pattern, disposed on the peripheral area of the substrate, wherein in the second region, the at least one dummy-color photoresist pattern is disposed at least partially around the at least one of the second photo spacers, and a projection area of the at least one dummy-color photoresist pattern in the second region on the substrate is b, wherein $(b/B)*100\%$ is defined as a second coverage rate N,
wherein the first projection area A is substantially equal to the second projection area B, and $27\% \leq (N-M) \leq 58\%$.

2. The color filter substrate of claim 1, wherein materials of the first photo spacers and the second photo spacers are substantially the same.

3. The color filter substrate of claim 1, wherein the at least one dummy-color photoresist pattern comprises at least one color of a color photoresist.

4. The color filter substrate of claim 1, wherein the at least one dummy-color photoresist pattern includes a stack of at least two colors of color photoresists, and a thickness of the stack of the at least two colors of the color photoresists is smaller than a thickness of the at least one of the second photo spacers.

5. The color filter substrate of claim 1, wherein the at least one of the first photo spacers is located at a shape center of the first region.

6. The color filter substrate of claim 1, wherein the at least one of the second photo spacers is located at a shape center of the second region.

7. The color filter substrate of claim 1, wherein in the second region, the at least one dummy-color photoresist pattern surrounds the at least one of the second photo spacers.

8. The color filter substrate of claim 1, wherein the display area further has a plurality of sub-pixels, the first projection area A and the second projection area B are respectively a projection area of a single pixel, and each of the single pixels comprises at least three sub-pixels.

9. The color filter substrate of claim 1, wherein in the second region, the at least one dummy-color photoresist pattern surrounding the at least one of the second photo spacers comprises a plurality of blocks separated from each other.

10. The color filter substrate of claim 9, wherein the at least one dummy-color photoresist pattern further comprises at least one connection block, and the at least one connection block connects the two adjacent blocks separated from each other.

11. The color filter substrate of claim 1, wherein the at least one dummy-color photoresist pattern further comprises at least one gap, and the at least one gap extends along a predetermined direction.

12. The color filter substrate of claim 1, wherein in the second region, a bottom of the at least one of the second photo spacers does not contact the at least one dummy-color photoresist pattern.

13. The color filter substrate of claim 12, wherein in the second region, an orthogonal projection of the at least one of the second photo spacers and the at least one dummy-color photoresist pattern on the substrate are not overlapped.

14. The color filter substrate of claim 1, wherein in the first region, a bottom of the at least one of the first photo spacers does not contact the color photoresist patterns.

15. The color filter substrate of claim 14, wherein in the first region, an orthogonal projection of the at least one of the first photo spacers and the color photoresist patterns on the substrate are not overlapped.

16. The color filter substrate of claim 1, further comprising:
a black matrix, disposed between the first photo spacers and the substrate and between the second photo spacers and the substrate.

17. The color filter substrate of claim 1, wherein a thickness of any one of the second photo spacers is H, a thickness of any one of the first photo spacers is h, and $0.35\ \mu m \leq (H-h) \leq 0.6\ \mu m$.

18. The color filter substrate of claim 1, wherein a projection area of the color photoresist patterns in the first region is smaller than a projection area of the at least one dummy-color photoresist pattern in the second region.

19. A display panel, comprising:
the color filter substrate of claim 1; and
a counter substrate, disposed opposite to the color filter substrate, wherein the first photo spacers and the second photo spacers are located between the counter substrate and the substrate.

20. A display panel, comprising:
the color filter substrate of claim 1; and
a counter substrate, disposed opposite to the color filter substrate, wherein the first photo spacers and the second photo spacers are located between the counter substrate and the substrate, each of the second photo spacers has a compression amount, and the compression amount is substantially equal to a thickness of the at least one of the second photo spacers in the second region minus a thickness of the at least one of the first photo spacers in the first region, and the compression amount is substantially not smaller than 0.35 μm, and is substantially not greater than 0.6 μm.

* * * * *